(12) United States Patent  
Kim et al.

(10) Patent No.: US 8,682,367 B2  
(45) Date of Patent: Mar. 25, 2014

(54) BASE STATION AND USER EQUIPMENT FOR PERFORMING COMP TRANSMISSION AND METHOD THEREOF

(75) Inventors: Hyung-sub Kim, Seoul (KR); Kyung Sook Kim, Daejeon (KR); Yeon Seung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 142 days.

(21) Appl. No.: 13/230,189

(22) Filed: Sep. 12, 2011

(65) Prior Publication Data

US 2012/0064927 A1  Mar. 15, 2012

(30) Foreign Application Priority Data

Sep. 13, 2010  (KR) .......................... 10-2010-0089287

(51) Int. Cl.
*H04B 15/00* (2006.01)
*H04W 72/08* (2009.01)

(52) U.S. Cl.
USPC ..... 455/501; 455/63.1; 455/456.3; 455/67.13

(58) Field of Classification Search
USPC ........ 455/500, 414.1, 446, 450, 452.1, 452.2, 455/456.1, 456.3, 509, 67.11, 501, 63.1, 455/63.2, 67.13, 422.1; 375/259, 299; 370/338, 328, 329, 252
See application file for complete search history.

(56) References Cited

U.S. PATENT DOCUMENTS

2011/0103493 A1*  5/2011  Xia et al. .................. 375/259
2012/0269295 A9* 10/2012  Ko et al. .................. 375/299

FOREIGN PATENT DOCUMENTS

KR  10-2010-0064424  6/2010
WO  2010/101352 A2  9/2010

OTHER PUBLICATIONS

Etri, "Multi-cell PMI coordination for downlink CoMP," 3GPP TSG RAN WG1 Meeting #57bis, R1-092303, 4 pages. (2009).

* cited by examiner

*Primary Examiner* — John J Lee
(74) *Attorney, Agent, or Firm* — Nelson Mullins Riley & Scarborough LLP; Anthony A. Laurentano, Esq.

(57) ABSTRACT

A base station, a user equipment, and a method for operating a cooperative multipoint (CoMP) transmitter and receiver (Tx/Rx) are disclosed. The operating method includes receiving, from a peripheral cell, precoding matrix index (PMI) information to be used by a user equipment of the peripheral cell, and transmitting the received PMI information to target user equipments allocated with an entire frequency range, among a plurality of user equipments present in a current cell.

18 Claims, 6 Drawing Sheets

BASE STATION AND USER EQUIPMENT FOR PERFORMING COMP TRANSMISSION AND METHOD THEREOF

CROSS-REFERENCE TO RELATED APPLICATION

This application claims the benefit of Korean Patent Application No. 10-2010-0089287, filed on Sep. 13, 2010, in the Korean Intellectual Property Office, the disclosure of which is incorporated herein by reference.

BACKGROUND

1. Field of the Invention

The present invention relates to a base station, a user equipment, and a method for performing a cooperative multipoint (CoMP) transmission, and more particularly, to base station, a user equipment, and a method for performing a CoMP transmission to enhance service quality of the user equipment by minimizing inter-cell interference.

2. Description of the Related Art

An orthogonal frequency division multiplexing (OFDM), one of multiplexing connection methods used in a mobile communication system, shows a relatively high system performance in comparison to a code division multiple access (CDMA) since the OFDM reduces interference among user equipments present in one cell. However, even though the interference among user equipments is reduced, interference among cells, that is, inter-cell interference generated from peripheral cells, still remains unsolved. The inter-cell interference is a significant factor that decreases the system performance.

SUMMARY

An aspect of the present invention provides a base station, a user equipment, and a method for performing a cooperative multipoint (CoMP) transmission capable of effectively minimizing inter-cell interference and thus, improving the service quality of a user equipment located in a periphery of a predetermined cell.

According to an aspect of the present invention, there is provided a method of operating a CoMP transmitter and receiver (Tx/Rx), including receiving, from a peripheral cell, precoding matrix index (PMI) information to be used by a user equipment of the peripheral cell, and transmitting the received PMI information to target user equipments allocated with an entire frequency range, among a plurality of user equipments present in a current cell.

According to another aspect of the present invention, there is provided a base station for operating a CoMP Tx/Rx, including a communication unit to receive, from a peripheral cell, PMI information to be used by a user equipment of the peripheral cell, and a control unit to control the communication unit to transmit the received PMI information to target user equipments allocated with an entire frequency range, among a plurality of user equipments present in a current cell.

According to another aspect of the present invention, there is provided a method of scheduling a user equipment which is located in the same cell as a base station for operating a CoMP Tx/Rx, and which is located in a center of the cell, the method including receiving, from the base station, PMI information to be used by a user equipment of a peripheral cell, and scheduling a frequency range to be used, based on the received PMI information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings. In the following description, detailed descriptions related to well-known functions or configurations will be ruled out in order not to unnecessarily obscure subject matters of the present invention. In addition, technical terms are used only for effectively explaining the embodiments and therefore may be varied according to intentions of a user or operator, or customs of the field of the invention. That is, the terms are to be defined based on the entire specification.

Hereinafter, an operation procedure for effectively applying a cooperative multipoint (CoMP) scheme to a communication system and a functional block for the procedure will be described with reference to the embodiments.

Figure 1:
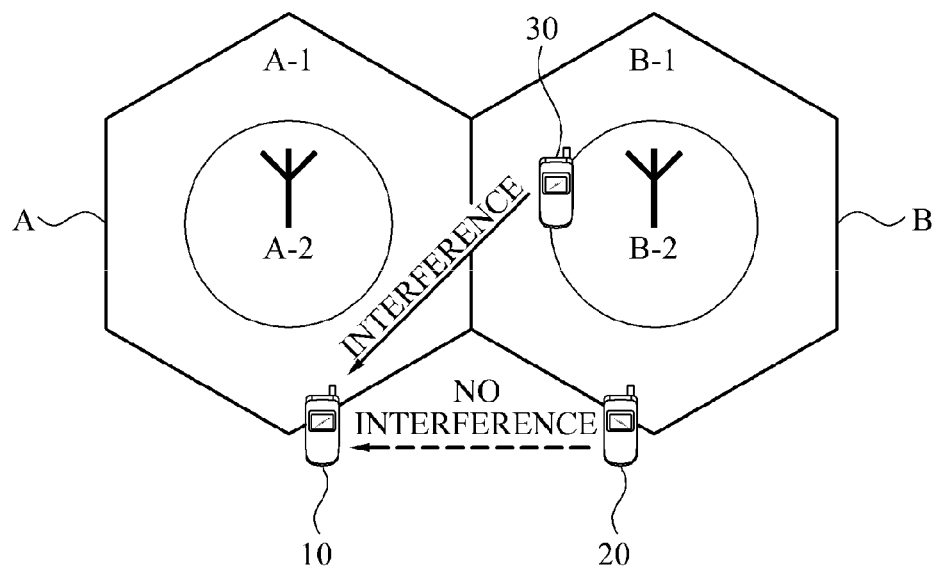
FIG. 1 is a diagram illustrating a communication system according to an embodiment of the present invention.

FIG. 1 illustrates an exemplary communication system applied to the embodiments of the present invention.

Referring to FIG. 1, cells A and B are each divided into peripheries A-1 and B-1 and centers A-2 and B-2. A first user equipment 10 and a second user equipment 20 are located in the peripheries A-1 and B-1 of the cells A and B, respectively. A third user equipment 30 is located in the center B-2 of the cell B. Any communication terminals such as a mobile phone, a laptop, a notebook, and the like may be used as the user equipment.

According to the embodiment, the communication system may employ a CoMP transmitter and receiver (Tx/Rx) to relieve interference between the cells A and B while improving the performance of the first user equipment 10 located in the periphery A-1. As the interference between the cells A and B is relieved, the service quality of the first and the second user equipments 10 and 20 located in the peripheries A-1 and B-1 may increase.

The CoMP scheme is a dynamic scheduling technology similar with an inter-cell interference coordination (ICIC) scheme and a precoding matrix index (PMI) coordination scheme.

The ICIC improves the system performance by reducing interference affecting other adjoining cells. As shown in FIG. 1, the ICIC may apply a fractional frequency reuse (FFR) system. The FFR ICIC sets frequency ranges allocated to the first to the third user equipments 10 to 30 located in the peripheries A-1 and B-1 and the centers A-2 and B-2 of the cells A and B so as to reduce the interference between the cells A and B.

Figure 2:
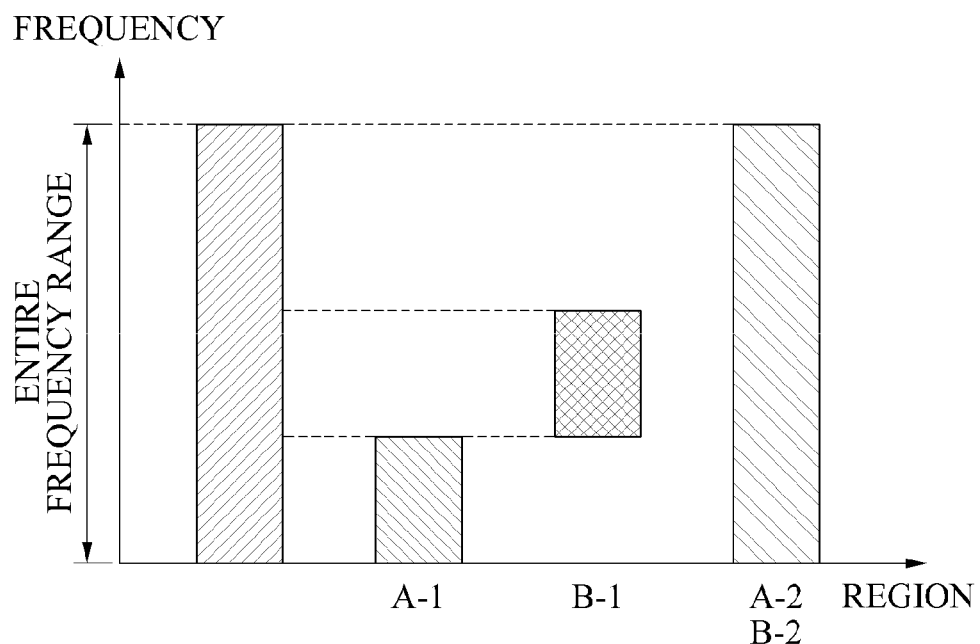
FIG. 2 is a diagram illustrating exemplary frequency ranges allocated according to positions of the cells.

FIG. 2 illustrates examples of the frequency range allocated according to positions of the cells A and B.

Referring to FIG. 2, an entire frequency range applicable to a communication system may be allocated to the centers A-2 and B-2 of the cells A and B. The entire frequency range comprises all frequency ranges where a peripheral cell and a current cell are available. Also, non-overlapping frequency ranges may be allocated to the peripheries A-1 and B-1 to prevent interference between the first user equipment 10 and the second user equipment 20. Accordingly, the interference between the cells A and B is reduced, thereby enhancing the communication performance of the first to the third user equipments 10 to 30. However, since the entire frequency range is allocated to the centers A-2 and B-2, the third user equipment 30 located in the center B-2 may continuously interfere with the first user equipment 10 located in the periphery A-2. The PMI coordination scheme is used to prevent such interference.

The "PMI" may refer to a parameter related to a physical layer, or a parameter related to beam forming applied to a multiple input multiple output (MIMO) system. That is, the "PMI" may refer to a channel between a user equipment and a base station. Since interference may be caused when the same frequency is used in different cells, the PMI coordination coordinates the frequency range so that the interference is minimized. For example, according to the PMI coordination scheme, when a predetermined user equipment requests a base station of a peripheral cell for use restriction or use recommendation of a predetermined PMI, the base station of the peripheral cell may coordinate such that a beam is not formed with respect to a resource causing interference to the specific user equipment.

Figure 3:
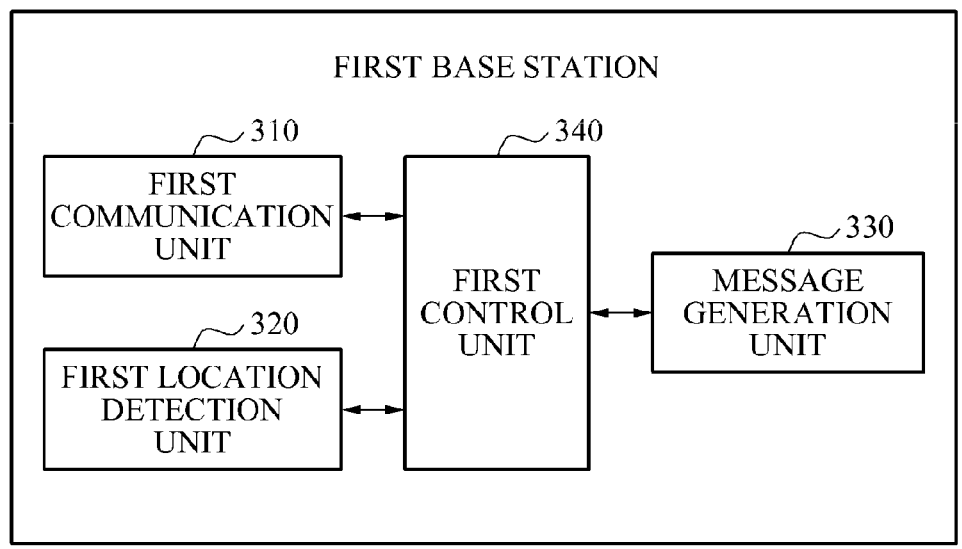
FIG. 3 is a block diagram illustrating a first base station for performing a cooperative multipoint (CoMP) transmission, according to an embodiment of the present invention.

FIG. 3 is a block diagram illustrating a first base station for performing a CoMP transmission, according to an embodiment of the present invention.

A first base station 300 of FIG. 3 may be located in the cells A and B shown in FIG. 1. A current cell and a peripheral cell may be the cells A and B of FIG. 1.

Referring to FIG. 3, the first base station 300 may include a first communication unit 310, a first location detection unit 320, a message generation unit 330, and a first control unit 340.

The first communication unit 310 may communicate wired or wirelessly through a communication network with various devices such as user equipments present in the current cell and a base station present in the peripheral cell. Specifically, the first communication unit 310 may receive PMI information from the base station or a user equipment of the peripheral cell. The PMI information may include information on at least one of a PMI to be used and of a PMI to be not used by the user equipments of the peripheral cell.

For example, the PMI information may be received by a codebook containing a codebookSubsetRestriction parameter. The codebookSubsetRestriction parameter may be configured as follows.

| codebookSubsetRestriction | CHOICE { |
|---|---|
| n2TxAntenna-tm3 | BIT STRING (SIZE (2)), |
| N4TxAntenna-tm3 | BIT STRING (SIZE (4)), |
| n2TxAntenna-tm4 | BIT STRING (SIZE (6)), |
| n4TxAntenna-tm4 | BIT STRING (SIZE (64)), |
| n2TxAntenna-tm5 | BIT STRING (SIZE (4)), |
| n4TxAntenna-tm5 | BIT STRING (SIZE (16)), |
| n2TxAntenna-tm6 | BIT STRING (SIZE (4)), |
| n4TxAntenna-tm6 | BIT STRING (SIZE (16)), |

In the above, the user equipment of the peripheral cell may set BITSTRING=1 with respect to the PMI to be used and BITSTRING=0 with respect to the PMI to be not used.

The codebookSubsetRestriction parameter may be defined by a radio resource control (RRC) connection reconfiguration (RRCConnectionReconfiguration) message in accordance with a long term evolution (LTE)-A standards (3GPP 36.331 v9.2). In general, the RRCConnectionReconfiguration message refers to an RRC layer-3 (L3) message transmitted from the base station to the user equipment when an aspect of the user equipment is renewed, such as when initial connection or handover of the user equipment occurs. In the case of the initial connection, the user equipment may receive PMI information allowed to the user equipment through the RRCConnectionReconfiguration message and may transmit PMI information to be used for scheduling based on the received PMI information, to the base station through a channel quality indicator (CQI).

The first location detection unit 320 may detect locations of the user equipments in the current cell. The first location detection unit 320 may use various generally-known methods such as a global positioning system (GPS), a location-based service (LBS), and the like for the detection. Information on the locations may be transmitted to the first control unit 340.

The message generation unit 330 may generate the RRC-ConnectionReconfiguration message containing the received PMI information or the received codebookSubsetRestriction parameter, under the control of the first control unit 340.

The first control unit 340 may control operations of the structural components shown in FIG. 1 through a variety of control programs and processors. In particular, the first control unit 340 may recognize the number of target user equipments to which the entire frequency range is allocated, among the user equipments present in the current cell. For example, the entire frequency range may be allocated to user equipments located in a center of the current cell.

In addition, the first control unit 340 may control the first communication unit 310 to transmit the received PMI information to the recognized target user equipments. In this case, for example, the first control unit 340 may control the first communication unit 310 to transmit the RRCConnectionReconfiguration message to the target user equipments located in the center, by referring to the locations detected by the first location detection unit 320. As a result, the number of times of transmitting the RRCConnectionReconfiguration message is reduced. The target user equipments receiving the RRCConnectionReconfiguration message may make a schedule regarding an available PMI by referring to the PMI information contained in the RRCConnectionReconfiguration message. In FIG. 1, a user equipment interfering with the first user equipment 10 located in the periphery A-1 is the third user equipment 30. Therefore, when the base station of the cell A requests the base station of the cell B for restriction of a PMI, only the third user equipment 30 may be informed of which PMI is requested to be restricted. Accordingly, the second user equipment 20 located in the periphery B-1 is already allocated with a frequency not to cause interference with the first user equipment 10 located in the periphery A-1. Therefore, the base station of the cell B that received the PMI information from the base station of the cell A may transmit the RRCConnectionReconfiguration message containing the PMI information to the third user equipment 30 located in the center B-2.

Figure 4:
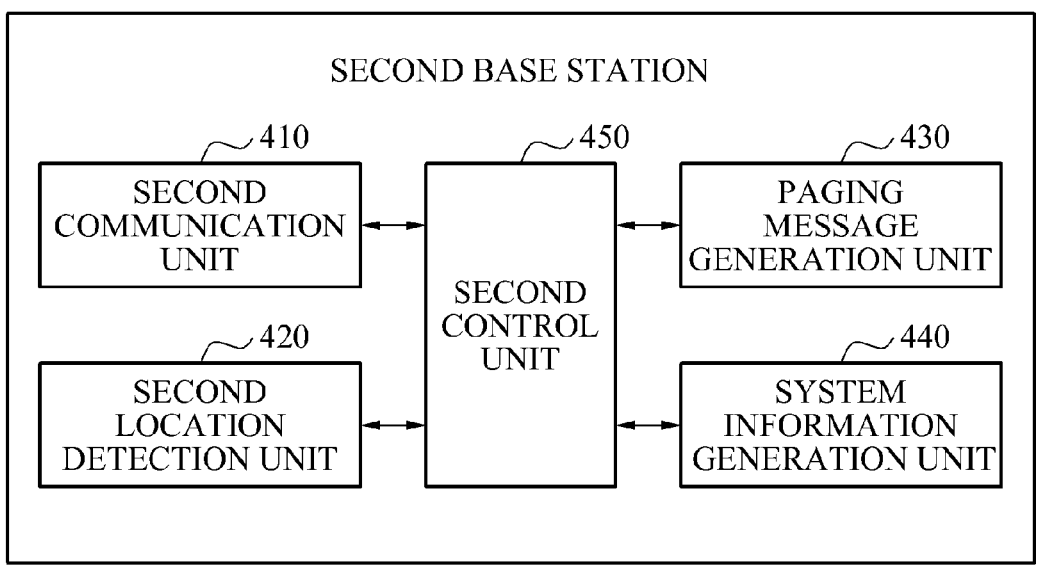
FIG. 4 is a block diagram illustrating a second base station for performing a CoMP transmission, according to an embodiment of the present invention.

FIG. 4 is a block diagram illustrating a second base station 400 for performing a CoMP transmission, according to an embodiment of the present invention.

The second base station 400 of FIG. 4 may be located in the cells A and B shown in FIG. 1. A current cell and a peripheral cell may be the cells A and B of FIG. 1.

Referring to FIG. 4, the second base station 400 may include a second communication unit 410, a second location detection unit 420, a paging message generation unit 430, a system information generation unit 440, and a second control unit 450. Since the second communication unit 410 and the second location detection unit 420 function in a similar manner as the first communication unit 310 and the first location detection unit 320, a detailed description thereof will be omitted.

The second communication unit 410 may communicate wired or wirelessly through a communication network with various devices such as user equipments present in the current cell and a base station of the peripheral cell. The second communication unit 410 may receive PMI information from the base station or a user equipment of the peripheral cell. For example, the PMI information may be received in the form of a codebook containing a codebookSubsetRestriction parameter.

The second location detection unit 420 may detect locations of the user equipments present in the current cell. Information on the detected locations may be transmitted to the second control unit 420.

The paging message generation unit 430 may generate a paging message containing a flag for predicting transmission of the received PMI information, under the control by the second control unit 450. For example, the paging message generation unit 430 may add a new parameter 'PMI_Modification_Noti (1)' to the paging message. When information other than the PMI information is changed, the paging message generation unit 430 may add a parameter 'PMI_Modification_Noti (0)' or another type of parameter to the paging message. That is, the parameter 'PMI_Modification_Noti (1)' refers to a parameter to predict change of the PMI information.

The system information generation unit 440 generates system information containing the received PMI information, under the control by the second control unit 450. For example, the system information generation unit 440 may generate the system information by adding the codebookSubsetRestriction parameter containing the PMI information to one of system information blocks constituting the system information.

Upon receiving the PMI information from the peripheral cell, the second control unit 450 controls the paging message generation unit 430 to generate a new paging message for notifying the target user equipments of a change of the codebookSubsetRestriction parameter. The second control unit 450 may control the second communication unit 410 to transmit the new paging message only to target user equipments located in the center among the target user equipments detected by the second location detection unit 420. The target user equipments receiving the new paging message may recognize a change of the PMI information through the parameter 'PMI_Modification_Noti (1)' and then prepare for a subsequent operation.

When transmission of the new paging message is completed, the second control unit 450 may control the system information generation unit 440 and the second communication unit 410 to generate system information containing the PMI information and to transmit the system information to the target user equipments in the current cell, respectively.

For example, the second control unit 450 may transmit the paging message and the system information to the user equipments through a system information change procedure defined according to the LTE-A standards.

Figure 5:
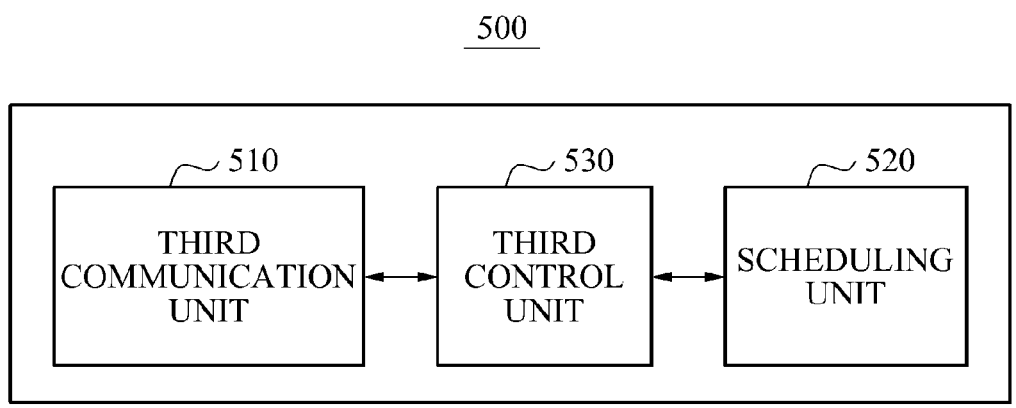
FIG. 5 is a block diagram illustrating a user equipment, according to an embodiment of the present invention.

FIG. 5 is a block diagram illustrating a user equipment 500 according to an embodiment of the present invention.

The user equipment 500 of FIG. 5 is located in a center of a current cell, the center to which an entire frequency range is allocated. Referring to FIG. 5, the user equipment 500 includes a third communication unit 510, a scheduling unit 520, and a third control unit 530.

The third communication 510 may communicate wired or wirelessly through a communication network with various devices such as user equipments present in the current cell and a base station of a peripheral cell. The third communication unit 510 may receive PMI information from a base station of the current cell. The PMI information may include information on at least one of a PMI to be used and a PMI to be not used by a user equipment of the peripheral cell. The base station of the current cell may be located in the same cell as the user equipment 500, being one of the first base station 300 and the second base station 400.

In the case that the base station is the first user equipment 300, the third communication unit 510 may receive the RRCConnectionReconfiguration message containing the PMI information from the base station.

The scheduling unit 520 may recognize the PMI information by parsing the received RRCConnectionReconfiguration message. Specifically, the scheduling unit 520 may schedule the frequency range using an available PMI from among the recognized PMI information.

The third control unit 530 may control the third communication unit 510 to transmit the schedule result to the base station.

Conversely, in the case that the base station is the second base station 400, the third communication unit 510 may receive the paging message notifying of reception of the changed PMI information, from the base station. The third control unit 530 may recognize the parameter 'PMI_Modification_Noti (1)' by parsing the paging message, and therefore recognize a change of the PMI information. Accordingly, the third control unit 530 may control the scheduling unit 520 to prepare for a new scheduling.

The third communication unit 510 may receive, from the base station, the system information containing the PMI information.

The scheduling unit 520 may recognize the PMI information by parsing the received system information. Specifically, the scheduling unit 520 may schedule the frequency range using a preferred PMI of the recognized PMI information.

The third control unit 530 may control the third communication unit 510 to transmit the schedule result to the base station.

Figure 6:
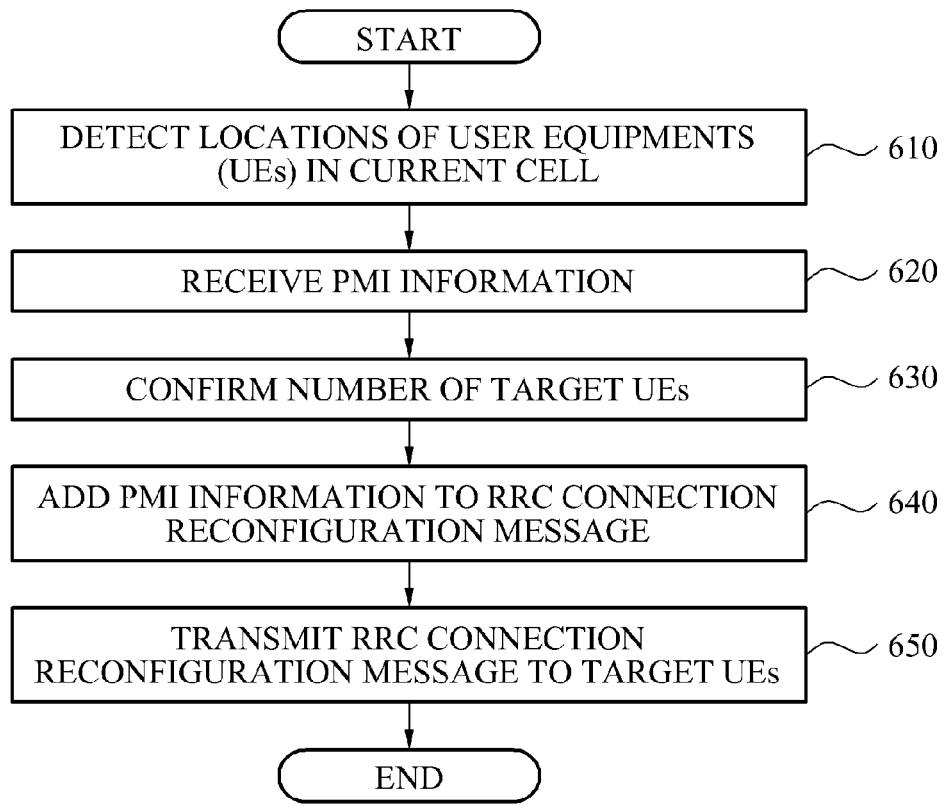
FIG. 6 is a flowchart for describing a method for performing a CoMP transmission of a first base station according to an embodiment of the present invention.

FIG. 6 is a flowchart for describing a method for operating a CoMP of a first base station.

The first base station shown in FIG. 6 may be implemented by the first base station 300 or the first control unit 340 of FIG. 3, or a processor in terms of hardware or software.

In operation 610, the first base station may periodically detect locations of user equipments of a current cell. The current cell refers to a cell to which the first base station belongs. In other words, the locations of the user equipments present in a center and a periphery of the current cell are detected in operation 610.

In operation 620, the first base station may receive PMI information from a base station or user equipments of a peripheral cell. The PMI information may include information on at least one of a PMI to be used and a PMI to be not used by the user equipments of the peripheral cell. For example, the PMI information may be received by a codebook containing a codebookSubsetRestriction parameter.

In operation 630, the first base station may recognize the number of target user equipments allocated with an entire frequency range among the user equipments of the current cell. The entire frequency range may be allocated to the user equipments located in the center of the current cell.

In operation 640, the first base station may add the PMI information to an RRCConnectionReconfiguration message.

In operation 650, the first base station may transmit the RRCConnectionReconfiguration message to which the PMI information is added, to the target user equipments.

Figure 7:
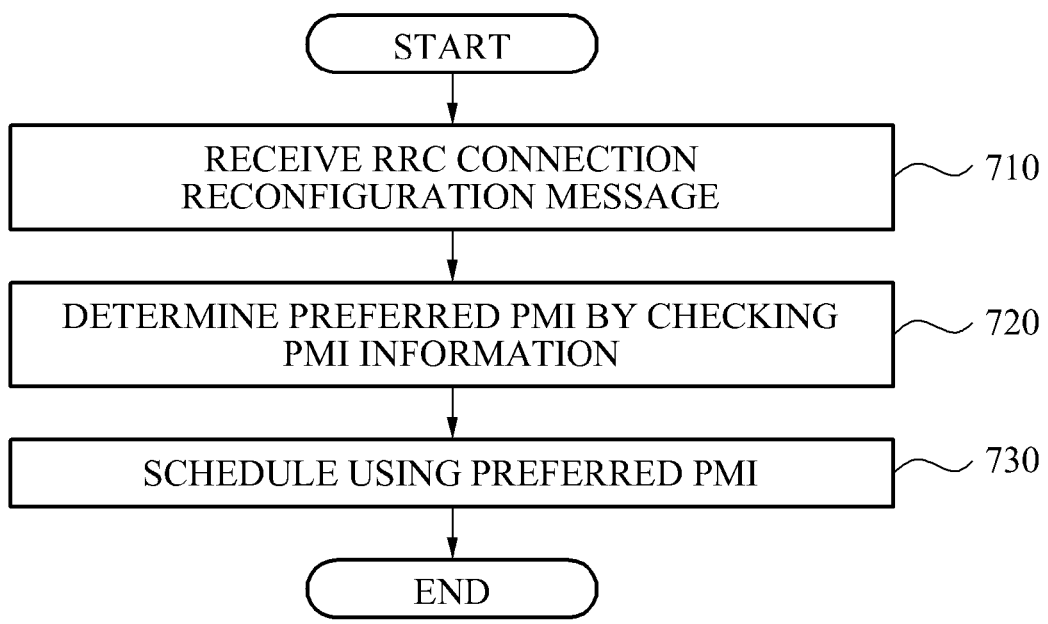
FIG. 7 is a flowchart for describing a scheduling method of a target user equipment according to an embodiment of the present invention.

FIG. 7 is a flowchart for describing a scheduling method of a target user equipment according to an embodiment of the present invention.

The target user equipment of FIG. 7 may be located in the same current cell as the first base station 300, and may be the user equipment 500 of FIG. 5.

In operation 710, the target user equipment may receive, from the first base station, an RRCConnectionReconfiguration message containing PMI information.

In operation 720, the target user equipment may recognize the PMI information contained in the RRCConnectionReconfiguration message and thereby determine a preferred PMI. More specifically, the target user equipment may recognize available PMIs from the PMI information and determine the preferred PMI from among the recognized PMIs.

In operation 730, the target user equipment may schedule the frequency range using the preferred PMI.

Figure 8:
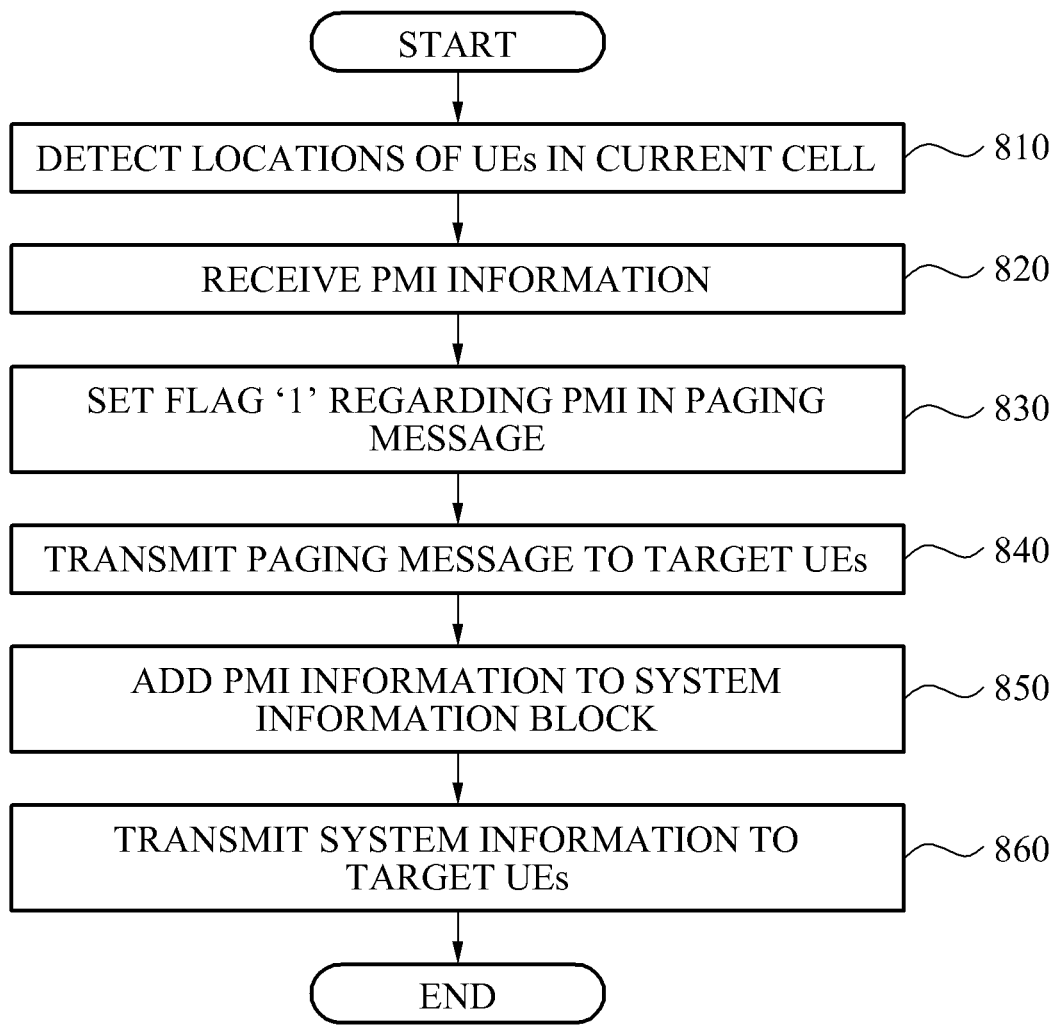
FIG. 8 is a flowchart for describing a method for performing a CoMP transmission of a second base station according to an embodiment of the present invention.

FIG. 8 is a flowchart for describing a method for performing a CoMP transmission of a second base station.

The second base station of FIG. 8 may be implemented by the second base station 400 or the second control unit 450 of FIG. 4, or a processor.

In operation 810, the second base station may periodically detect locations of user equipments in a current cell. The second base station belongs to the current cell.

In operation 820, the second base station may receive the PMI information from a base station or a user equipment of a peripheral cell.

In operation 830, the second base station may generate a paging message, more specifically, a paging message containing a parameter in which a PMI-related flag is set to '1.' The contained parameter may be in the form of 'PMI_Modification_Noti (1).'

In operation 840, the second base station may transmit the paging message to target user equipments. The target user equipments may be the user equipments in the current cell, to which the entire frequency range is allocated. Also, the target user equipments may be located in the center of the current cell.

In operation 850, the second base station may generate system information containing the received PMI information. For example, the second base station may generate the system information by adding a codebookSubsetRestriction parameter containing the PMI information to one of system information blocks constituting the system information.

In operation 860, the second base station may transmit the system information to the target user equipments.

Figure 9:
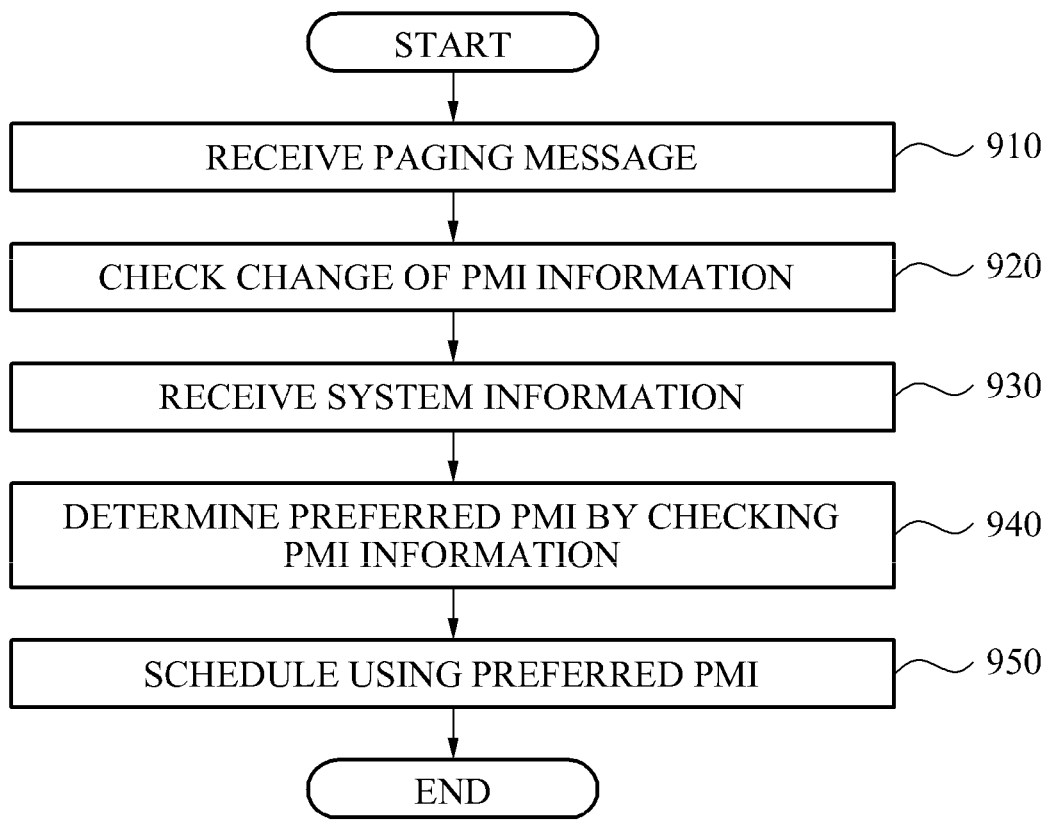
FIG. 9 is a flowchart for describing a scheduling method of a target user equipment according to another embodiment of the present invention.

FIG. 9 is a flowchart for describing a scheduling method of a target user equipment according to another embodiment of the present invention.

The target user equipment of FIG. 9 may be located in the same current cell as the second base station 400, and may be the user equipment 500 of FIG. 5.

In operation 910, the target user equipment may receive a paging message from the second base station. The paging message may contain the parameter predicting transmission of the changed PMI information.

In operation 920, the target user equipment may recognize whether a PMI is changed by parsing the paging message. That is, the target user equipment may recognize, through the paging message, whether the changed PMI information will be received from the second base station. For example, when the parameter 'PMI_Modification_Noti (1)' is contained in the paging message, the target user equipment may determine that the changed PMI will be received.

In operation 930, the target user equipment may receive system information containing the PMI information from the second base station.

In operation 940, the target user equipment may determine the preferred PMI by recognizing the PMI contained in the system information.

In operation 950, the user equipment may schedule the frequency range using the preferred PMI.

According to the embodiments disclosed above, changed PMI information is transmitted to user equipments located in a center of a cell, that is, the user equipments allocated with the entire frequency range. Accordingly, the number of times of transmitting the PMI information and time elapsed for transmission of the PMI information may be minimized.

In addition, according to the embodiments, since the CoMP is performed in the optimal circumstance by cooperation with the peripheral cell, errors caused by inter-cell interference may be minimized.

The embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of operating a cooperative multipoint (CoMP) transmitter and receiver (Tx/Rx), comprising:
   receiving, by a current cell from a peripheral cell, precoding matrix index (PMI) information to be used by a user equipment of the peripheral cell; and
   transmitting, by the current cell, the received PMI information to target user equipment allocated with an entire frequency range for communication in the current cell, among a plurality of user equipment present in the current cell.

2. The method of claim 1, further comprising detecting locations of the target user equipment allocated with the entire frequency range.

3. The method of claim 1, wherein the transmitting of the received PMI information transmits a radio resource control (RRC) connection reconfiguration message containing the PMI information to the target user equipment.

4. The method of claim 1, wherein the transmitting of the received PMI information transmits system information containing the PMI information to the target user equipment.

5. The method of claim 4, further comprising:
setting a flag adapted to predict transmission of the PMI information in a paging message; and
transmitting the flag-set paging message to the target user equipment.

6. The method of claim 1, wherein the entire frequency range is allocated to user equipment located in a center of the current cell.

7. The method of claim 1, wherein the entire frequency range comprises all frequency ranges where the peripheral cell and the current cell are available.

8. A base station for operating a cooperative multipoint (CoMP) transmitter and receiver (Tx/Rx), comprising:
a communication unit to receive, by a current cell from a peripheral cell, precoding matrix index (PMI) information to be used by a user equipment of the peripheral cell; and
a control unit to control the communication unit to transmit, by the current cell, the received PMI information to target user equipment allocated with an entire frequency range for communicating in the current cell, among a plurality of user equipment present in the current cell.

9. The base station of claim 8, further comprising a location detection unit to detect locations of the target user equipment allocated with the entire frequency range.

10. The base station of claim 8, wherein the control unit inserts the PMI information into a radio resource control (RRC) connection reconfiguration message and controls the communication unit to transmit the RRC connection reconfiguration message to the target user equipment.

11. The base station of claim 8, wherein the control unit inserts the PMI information into system information and controls the communication unit to transmit the system information to the target user equipment.

12. The base station of claim 11, wherein the control unit sets a flag adapted to predict transmission of the PMI information in a paging message, and controls the communication unit to transmit the flag-set paging message to the target user equipment.

13. The base station of claim 8, wherein the entire frequency range is allocated to user equipment located in a center of the current cell.

14. The base station of claim 8, wherein the entire frequency range comprises all frequency ranges where the peripheral cell and the current cell are available.

15. A method of scheduling a user equipment which is located in the same cell as a base station for operating a cooperative multipoint (CoMP) transmitter and receiver (Tx/Rx), and which is located in a center of the cell, the method comprising:
receiving, from the base station, PMI information to be used by a user equipment of a peripheral cell; and
scheduling a frequency range to be used, based on the received PMI information to avoid interference with the user equipment of the peripheral cell.

16. The method of claim 15, wherein the PMI information is received by being inserted into either an RRC connection reconfiguration message or system information.

17. A user equipment for scheduling, which is located in the same cell as a base station for operating a cooperative multipoint (CoMP) transmitter and receiver (Tx/Rx), and which is located in a center of the cell, the user equipment comprising:
a communication unit to receive, from the base station, PMI information to be used by a user equipment of a peripheral cell; and
a scheduling unit to schedule a frequency range to be used, based on the received PMI information to avoid interference with the user equipment of the peripheral cell.

18. The user equipment of claim 17, wherein the PMI information is received by being inserted into either an RRC connection reconfiguration message or system information.

* * * * *